Patented Sept. 4, 1945

2,384,268

UNITED STATES PATENT OFFICE 2,384,268

CYANOMETADIOXANES

Erving Arundale, Colonia, N. J., assignor to Standard Oil Development Company, a corporation of Delaware No Drawing. Application January 1, 1942,
Serial No. 425,381

8 Claims. (Cl. 260—338)

This invention relates to a process for the conversion of mono-olefinic hydrocarbons substituted by a nitrogen-containing radical, particularly unsaturated nitriles, to valuable substituted metadioxanes in which the substituent is a nitrogen-containing radical. These substituted metadioxanes are organic compounds containing a six-membered ring composed of 4 carbon atoms and 2 oxygen atoms in which the 2 oxygen atoms are attached to the same carbon atom and have the formula:

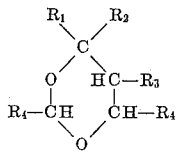

where $R_1$ and $R_3$ are hydrogen, alkyl, cyano alkyl or cyano groups, and $R_2$ and $R_4$ are hydrogen atoms or alkyl groups and where only one of the radicals $R_1$ or $R_3$ contains a cyano or cyano alkyl group. Of the alkyl radicals, methyl, ethyl, and propyl radicals may be mentioned as being typical.

Previous work has shown that unsaturated ethers, unsaturated halides, etc. can be reacted with aldehydes in the presence of acid catalysts to form substituted metadioxanes. However, it must not be assumed that all unsaturated compounds can be reacted with aldehydes under these conditions, for unsaturated acids and unsaturated ketones have not as yet been found to undergo such a condensation.

According to the present invention, mono-olefinic compounds having a nitrogen-containing substituent can be reacted with an aliphatic aldehyde in the presence of an acidic catalyst to yield metadioxanes substituted by a nitrogen-containing radical. This invention contemplates employing as a starting material unsaturated nitriles such as vinyl cyanide, allyl cyanide, isopropenyl cyanide, methallyl cyanide, isocrotyl cyanide, which contain only the elements carbon, hydrogen and nitrogen.

The tertiary unsaturated nitrogen compounds are the most applicable starting materials for the process, i. e., compounds in which two radicals are attached to one of the carbon atoms bearing the double bond.

The aldehyde employed is preferably formaldehyde. The term "acidic catalyst" is meant to include aqueous solutions, of between 10% and 90% concentration, of acids such as sulfuric, phosphoric, hydrofluoric, dihydroxyfluoboric, hydrofluoboric acid or boron fluoride water complexes.

The reaction proceeds at atmospheric pressure and at temperatures only slightly above room temperature. Although the speed of the reaction is increased by the use of higher temperatures, it is preferred to use only moderate temperatures. Since the reaction is exothermic, some means of cooling should be provided to dissipate the heat of reaction. The reaction is very rapid and is completed within several hours. The molar ratio of substituted mono-olefin to the aldehyde should be at least 1:2 but is preferably about 1.5:2.

The products of these reactions are usually liquids having relatively high boiling points and specific gravities greater than 1. The products of this invention are useful as chemical intermediates or as solvents.

The cyano dioxanes can also be subjected to alcoholysis, acid or alkaline hydrolysis, dehydrohydrolysis, reduction and the like. The conversion of the cyano derivatives of metadioxanes to nitrogen containing diolefins is an important utilization of this invention. The nitrodioxanes produced according to this invention may be reduced to the corresponding aminodioxanes.

Representative compounds obtainable according to this invention are: 4 methyl, 4 cyano methyl meta dioxane from methallyl cyanide and formaldehyde, 4,4 dimethyl 5 cyano meta dioxane from isocrotyl cyanide and formaldehyde; and 4 methyl, 4 cyano meta dioxane from methacrylonitrile and formaldehyde.

Small amounts of cyano substituted butylene glycols are formed as by-products in the reaction.

The following example is given for the purpose of illustrating the process of this invention:

Example 147 gms. of methallyl cyanide (B. P. 134–137° C. at atmospheric pressure—88% pure)

and 90 gms. of paraformaldehyde were placed in a reactor equipped with a heater, stirrer, and reflux condenser. The mixture was stirred and 75 cc. of a 50% sulfuric acid solution were added thereto. The mixture was then heated up to 50° C. over a period of five minutes and the heater was then removed. The heat of reaction slowly carried the temperature up as the formaldehyde reacted. The temperature was allowed to rise to 65° C. and was maintained between 63–65° C.

by intermittent heating and cooling. The total reaction time was about 1¾ hours. The formaldehyde reacted completely and two layers were present. The mixture was cooled and the lower acid layer withdrawn and rejected, no attempt being made to isolate by-products therefrom. The upper layer was neutralized with dilute sodium carbonate solution, dried, filtered and distilled under vacuum.

|   | Grams |
|---|---|
| Fraction I up to 55° C. at 6 mm | 40 |
| Fraction II 55° C. at 6 mm | 70 |
| 149° C. at 6 mm., mostly at 140–145° C. at 6 mm. | |
| Residue | 10.5 |

Fraction I consisted of unreacted methallyl cyanide.

Fraction II was redistilled at 1.5 mm. and 96% boiled from 114° C. at 1.5 mm.—117° C. at 1.5 mm. Bromine number 1.1 c.g./g.

Analysis showed the product to consist largely of the cyano metadioxane. Its refractive index was 1.4611 at 20° C.

What is claimed is:

1. A process of reacting a mono-olefinic hydrocarbon, substituted by a radical of the group selected from the class consisting of cyano and cyano alkyl groups and containing only the elements carbon, hydrogen and nitrogen, with formaldehyde in the presence of a dilute acid catalyst, under conditions to obtain a nitrogen-substituted metadioxane.

2. Process according to claim 1, in which a tertiary mono-olefinic hydrocarbon is used.

3. Cyano metadioxane of the general formula

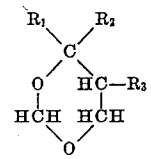

wherein $R_1$ and $R_3$ are selected from the group consisting of hydrogen atoms, alkyl hydrocarbon, cyano alkyl hydrocarbon, and cyano radicals, one and not more than one of the radicals $R_1$ and $R_3$ being a member of the group consisting of cyano alkyl hydrocarbon and cyano radical; the $R_2$ is a substituent selected from the group consisting of hydrogen atoms and alkyl radicals $R_1$, $R_2$ and $R_3$, containing no elements other than carbon, hydrogen and nitrogen.

4. The process of reacting an olefinic nitrile, which contains only the elements carbon, hydrogen and nitrogen, with an aldehyde in the presence of a dilute acid catalyst at temperature below about 80° C., while providing the reactants in a molal ratio of at least two mols of aldehyde to one of the olefinic nitrile.

5. Process according to claim 4 in which the olefinic nitrile contains a tertiary carbon atom and the aldehyde is formaldehyde.

6. The process of reacting methallyl cyanide with formaldehyde in the presence of 50% sulfuric acid at a temperature between 50–65° C. and recovering a cyano metadioxane.

7. As a composition of matter, 4-cyano methyl, 4-methyl metadioxane.

8. As a composition of matter, 4,4-dimethyl, 5-cyano metadioxane.

ERVING ARUNDALE.